(12) United States Patent
Mueller

(10) Patent No.: US 10,907,739 B2
(45) Date of Patent: Feb. 2, 2021

(54) PINCH VALVE

(71) Applicant: Louis E. Mueller, St. Louis, MO (US)

(72) Inventor: Louis E. Mueller, St. Louis, MO (US)

(73) Assignee: Christine L. Jeep Trustee of the Louis & Patricia Mueller Family Trust, Dated April 2nd, 2020, St. Louis, MO (US)

( * ) Notice: Subject to any disclaimer, the term of this patent is extended or adjusted under 35 U.S.C. 154(b) by 391 days.

(21) Appl. No.: 15/444,458

(22) Filed: Feb. 28, 2017

(65) Prior Publication Data

US 2017/0254423 A1    Sep. 7, 2017

Related U.S. Application Data

(60) Provisional application No. 62/303,161, filed on Mar. 3, 2016.

(51) Int. Cl.
*F16K 7/06* (2006.01)

(52) U.S. Cl.
CPC .................... *F16K 7/061* (2013.01)

(58) Field of Classification Search
CPC ..... F16K 7/02; F16K 7/04; F16K 7/06; F16K 7/061; A61M 39/28; A61M 39/283
USPC .................................. 251/6, 7, 8, 9
See application file for complete search history.

(56) References Cited

U.S. PATENT DOCUMENTS

| 820,216 | A | * | 5/1906 | Leffingwell et al. ...... A61M 39/284 24/498 |
|---|---|---|---|---|
| 2,615,668 | A | * | 10/1952 | Ernest ....................... F16K 7/06 137/156 |
| 2,876,937 | A | * | 3/1959 | Wilson ................... B67D 3/041 222/529 |
| 2,987,292 | A | | 6/1961 | Teson |
| 3,167,085 | A | * | 1/1965 | Redmer .............. A61M 39/283 137/315.07 |
| 3,584,830 | A | * | 6/1971 | Koehn ................ A61M 39/283 24/135 R |
| 4,065,093 | A | * | 12/1977 | Phillips ............... A61M 39/286 251/342 |

(Continued)

FOREIGN PATENT DOCUMENTS

EP       1099661 A1    5/2001

*Primary Examiner* — Kevin F Murphy
*Assistant Examiner* — Jonathan J Waddy
(74) *Attorney, Agent, or Firm* — Matthews Edwards LLC

(57) ABSTRACT

The pinch valve includes a valve member movable to compress or pinch a resilient tubular element extending through a passage of a housing or body of the valve to varying extents to regulate or prevent fluid flow through the tubular element. The valve member includes a valve head configured to pinch the tubular element through a range of progressively more flow restrictive crescent shapes into a generally U-shape, and while doing so cooperates with side surfaces of the body or housing to bend or fold over lateral end portions of the tubular element that form distal ends of the U-shape. The valve member additionally includes pinch shoulders that follow the pinch head and secondarily pinch or compress the folded over end portions together to complete closure of the tubular element as the U-shape is pinched closed, to prevent leaking, trapping of fluids, and damaging the tubular element under high fluid pressures.

21 Claims, 13 Drawing Sheets

(56) References Cited

U.S. PATENT DOCUMENTS

| | | | | |
|---|---|---|---|---|
| 4,340,201 A | * | 7/1982 | Becker, Jr. | A61M 39/286 251/6 |
| 4,475,708 A | * | 10/1984 | Becker, Jr. | A61M 39/286 251/6 |
| 4,475,709 A | * | 10/1984 | Becker, Jr. | A61M 39/286 251/6 |
| 4,877,053 A | * | 10/1989 | Yusko, Jr. | F16K 7/061 137/556 |
| 4,960,259 A | * | 10/1990 | Sunnanvader | A61M 39/28 251/7 |
| 5,082,025 A | * | 1/1992 | DeVries | A61M 1/3664 137/863 |
| 5,197,708 A | * | 3/1993 | Campau | F16K 7/061 251/4 |
| 5,730,323 A | | 3/1998 | Osborne | |
| 5,938,078 A | | 8/1999 | Dorsey et al. | |
| 7,309,055 B1 | * | 12/2007 | Spiegel | A61M 1/0078 222/102 |
| 2015/0204450 A1 | * | 7/2015 | Tuccelli | B01L 3/565 251/7 |

* cited by examiner

PINCH VALVE

This application claims the benefit of U.S. Provisional Application No. 62/303,161, filed Mar. 3, 2016.

TECHNICAL FIELD

This invention relates generally to a pinch valve including a valve member movable to compress or pinch a resilient tubular element extending through a passage of a housing or body of the valve to regulate or prevent fluid flow through the tubular element, and more particularly, that pinches the tubular element through a range of generally crescent shapes into a generally U-shape, and in doing so brings together and bends or folds over opposite lateral end portions of the tubular element that form the distal ends of the U-shape, respectively, then pinches them closed as the U-shape portion is pinched closed, to complete closure and prevent leaking, trapping of fluids, and damaging the tubular element under high fluid pressures.

BACKGROUND ART

U.S. Provisional Application No. 62/303,161, filed Mar. 3, 2016, is incorporated herein by reference in its entirety.

Pinch valves are well known for use in fluid flow applications requiring sanitary conditions for the fluids, such as, but not limited to, food and pharmaceutical manufacture, delivery, and distribution. Pinch valves generally include a length of a tubular element of a flexible material that carries the fluid, a length of the tubular element being disposed in a rigid valve housing, and a valve or pinch member that is pressed against the tubular element to close it completely or restrict flow through it. The tubular element can extend beyond the valve housing, or can connect to a fluid line via suitable couplers. Reference in this regard: Osborne, U.S. Pat. No. 5,730,323 entitled Automatic Pressure Regulated Liquid Dispensing Device that discloses a pinch valve generally; and Teson et al., U.S. Pat. No. 2,987,292, entitled Mechanically Operated Collapsible Valve that utilizes three balls for collapsing a tubular element in a Y shape. Reference also Dorsey et al., U.S. Pat. No. 5,938,078 entitled Valve for Beverage Dispenser that discloses an elongate pinch valve that pinches the tubular element longitudinally in a gradual manner when closing; and Phallen et al., European Patent Application Serial No. EP1099661 A1 entitled A High Speed Beverage Dispensing Method and Apparatus that utilizes an elongate pinch element for flow control through a tubular element.

While the referenced and other pinch valves presumably perform adequately for their intended purposes, it has been observed that valves having a pinch member or element that pinches the tubular element only over a short distance in the flow direction have several shortcomings. One is that the pinching force must be greater or concentrated to prevent leakage thereabout. The tubular element is also subject to earlier failure due to the higher pinching force required. In the known valves that pinch the tubular element longitudinally, it is either not completely pinched closed, e.g., European Patent Application Serial No. EP1099661 A1, used for flow control only; or it is pinched flat in conformance to a flat supporting surface, e.g., U.S. Pat. No. 5,938,078, which may be prone to leakage at higher pressures, e.g., greater than a few pounds per square inch.

It has also been observed that when the tubular element is pinched closed in some known valves, particularly those utilizing thicker walled tubular elements, small passages can be remain at the ends of the pinched together portions, essentially, where portions of the tubular element are folded over, through which leakage can occur.

As another observed shortcoming of several known pinch valves wherein one or both ends of the tubular element attaches to a coupling via frictional fit, e.g., using one or more barbs, it has been found that the closing action of the valve or pinch member can stretch or deform the tubular element past its elastic limit so as to form a small cavity between the tubular element and the coupling that can collect and trap fluid in which contaminants such as bacteria and/or fungus can grow, and which can be difficult or impossible to adequately clean and disinfect without disassembly. This can be impermissible for food, beverage, and pharmaceutical applications.

Thus, what is sought is a pinch valve, that overcomes one or more of the shortcomings and limitations set forth above, particularly, that provides effective closure under higher pressure conditions without damaging or significantly shortening the life of the tubular element and trapping fluids, and that reduces or eliminates occurrence of stretching or deformation in a manner to harbor contaminants.

SUMMARY OF THE INVENTION

What is disclosed is a pinch valve that overcomes one or more of the shortcomings and limitations set forth above, particularly, that provides effective closure under higher pressure conditions without damaging or shortening the life of the tubular element and trapping fluids, and that reduces or eliminates occurrence of stretching or deformation in a manner to harbor contaminants.

According to a preferred aspect of the invention, the valve includes a valve member that moves a pinch head laterally into a main passage of a housing or body of the valve containing the tubular element, to initially deform the tubular element from its original or free state sectional shape, e.g., round, oval, elliptical, polygonal, etc., into a generally crescent or similar shape to reduce and/or regulate flow, and then with further movement of the valve member, to deform into a generally U-shape to close and prevent flow. The pinch head preferably has a sectional shape generally the same as but a predetermined amount smaller than, an opposing inner surface bounding the main passage, and lateral or side surfaces that trail the tip or leading end of the pinch head and cooperate with opposing portions of the inner surface, to bend or fold over lateral end portions of the tubular element, that is, the opposite distal ends or legs of the U-shape. The valve member additionally includes associated laterally positioned elements, preferably in the form of pinch shoulders laterally of or adjacent to the sides of the pinch head, positioned in opposing relation to surface portions of the body or housing of the valve, and that also trail the tip or leading end of the pinch head, to contain or enclose and finally pinch the folded over lateral portions closed as the U-shape main portion of the tubular element is pinched closed, to completely prevent flow through the tubular element.

As an attendant advantage, the pinching elements are preferably configured such that as the tubular element is finally fully pinched closed, any remaining fluid between the portions being pinched together is forced out, e.g. by a squeezing or squeegeeing action, so as not to be trapped and stress the sidewall of the tubular element, even at higher pressures, e.g., greater than 40 psi but less than 125 psi and the like, and at lower temperatures, such as when carrying chilled process chemicals, spirits, etc, or when used in an outdoor or refrigerated environment. To facilitate this effect, the pinch head is preferably elongate in the flow direction and has a generally convergingly tapered or oval profile shape e.g., a boat or canoe hull profile shape when viewed in the flow direction, with no cavities or other shapes along the length thereof operable to trap and retain fluid between the pinched together sections of the tubular element.

According to another preferred aspect of the invention, the pinch shoulders and associated opposing surface portions can be angularly oriented in relation to a direction of movement of the valve member, as a non-limiting example, at between about a 20 degree and a 90 degree angle thereto. This can be desirable and advantageous, as the bent or folded over end portions of the tubular element that form the distal ends of the U-shape tend to form a loop at the very end, and this angularity and other shapes has been found to facilitate the smooth pinching together of the folded over portions in a manner to eliminate gaps and pockets that can trap fluid to deform, stretch, and/or weaken or perforate the sidewall. The pinch shoulders and associated adjacent sides of the pinch head can also be advantageously shaped, e.g., convex, concave, etc., and the opposing inner surfaces of the valve housing and side surfaces generally matingly shaped, e.g., concave, convex, etc., in a manner such that the folded together ends of the tubular element are pinched to remove any gaps and/or pockets.

According to another preferred aspect of the invention, the pinch head is elongate in the direction of flow through the tubular element, as a non-limiting example, from about 1.5 to several times the lateral extent of width of the tubular element, so as to pinch the tubular element three dimensionally, which has been found to reduce potential for leakage and also stress concentrations. Also preferably, the pinch head is sufficiently paced from connection to fittings such as barbed fittings, clamps, and the like, so that deformation of the tubular element does not form small gaps or crevices in which fluid can be trapped so as to become contaminants during later use.

As another preferred aspect of the invention, the valve member and pinch head are supported and move using a suitable actuator or drive, which as non-limiting examples, can include a threaded shaft or barrel, solenoid, servo motor, stepping motor, linear or rotary actuator, fluid cylinder, and/or a suitable mechanical linkage such as an over center or toggle mechanism, or the like, as a non-limiting example, manually operable for moving the valve member and pinch head between the open and closed positions.

DETAILED DESCRIPTION OF THE INVENTION

Figure 1:
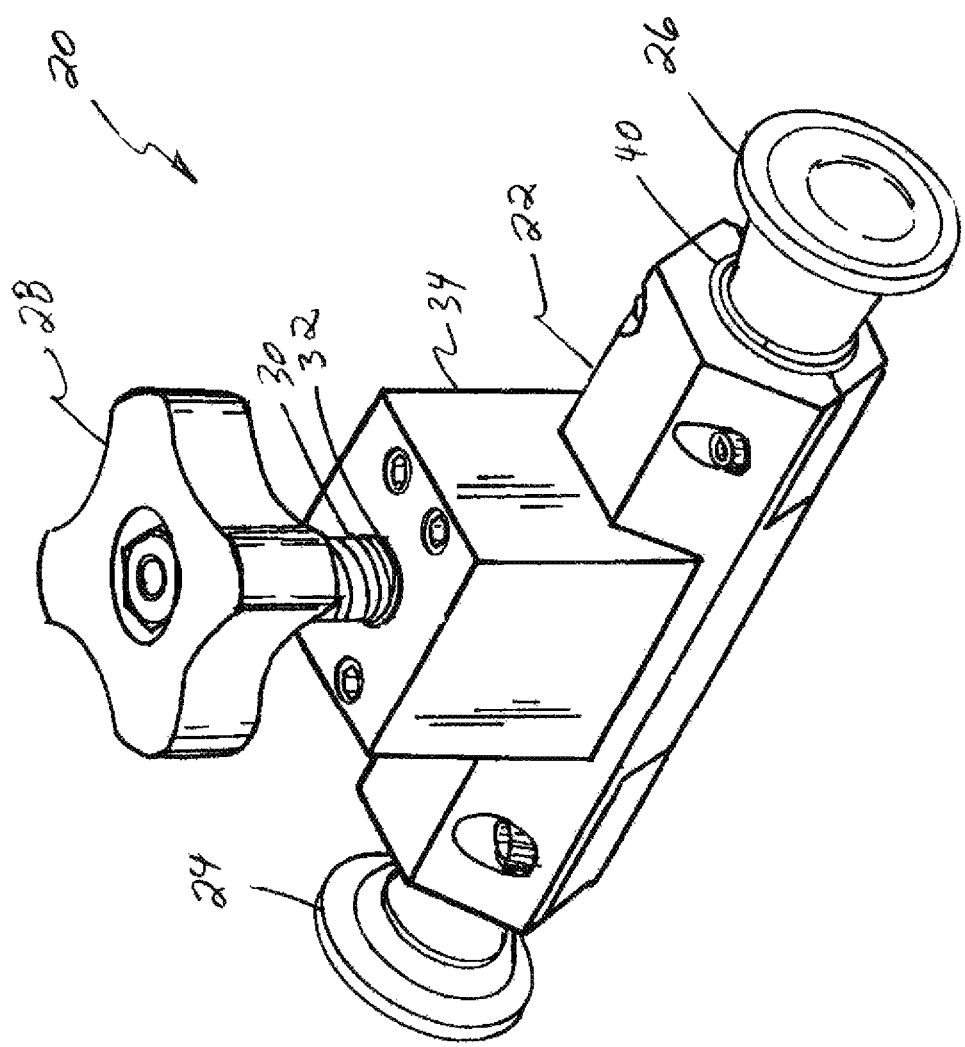
FIG. 1 is a perspective view of an embodiment of a pinch valve constructed and operable according to the teachings of the invention.
Figure 2:
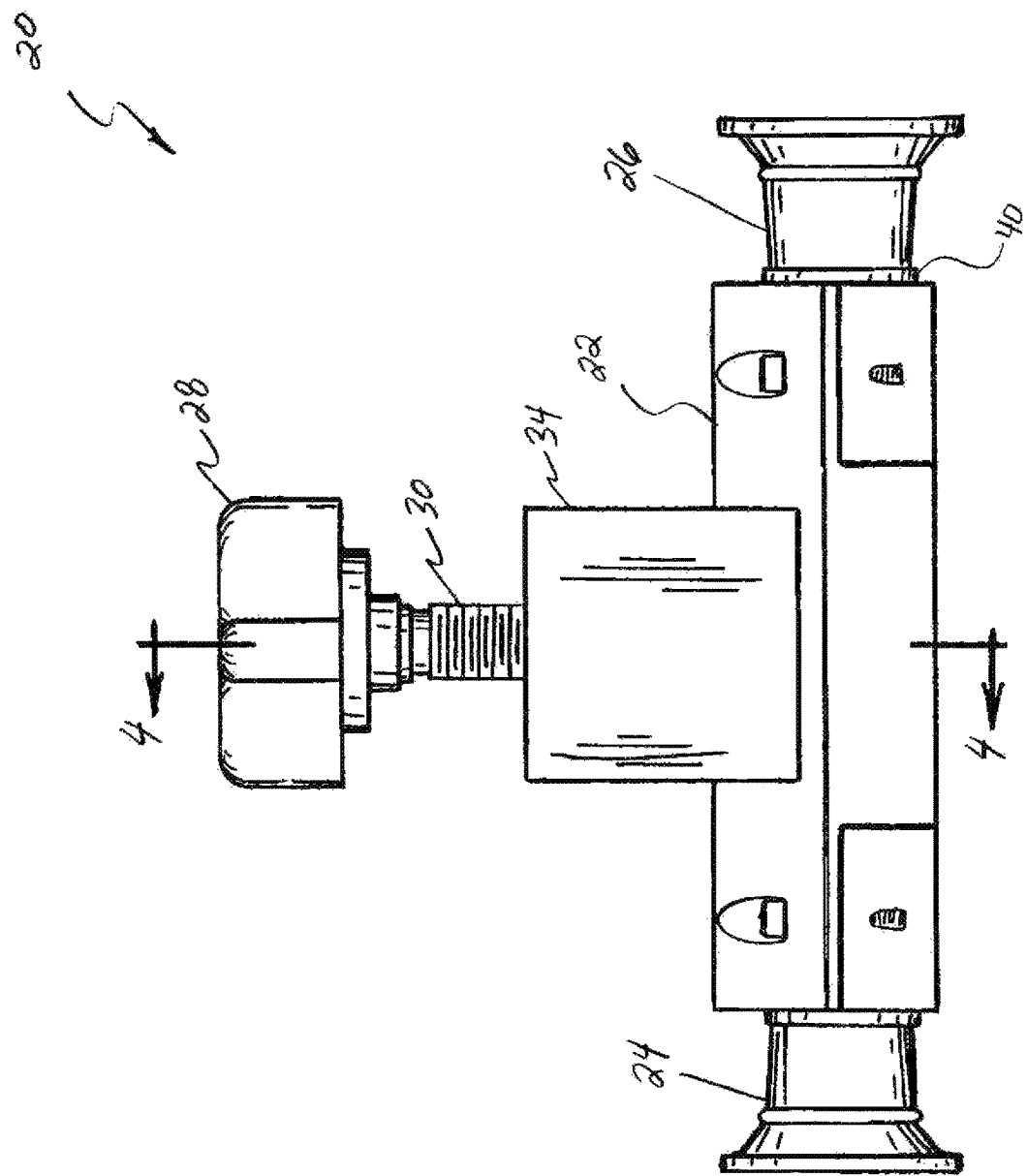
FIG. 2 is a side view of the pinch valve of FIG. 1.
Figure 3:
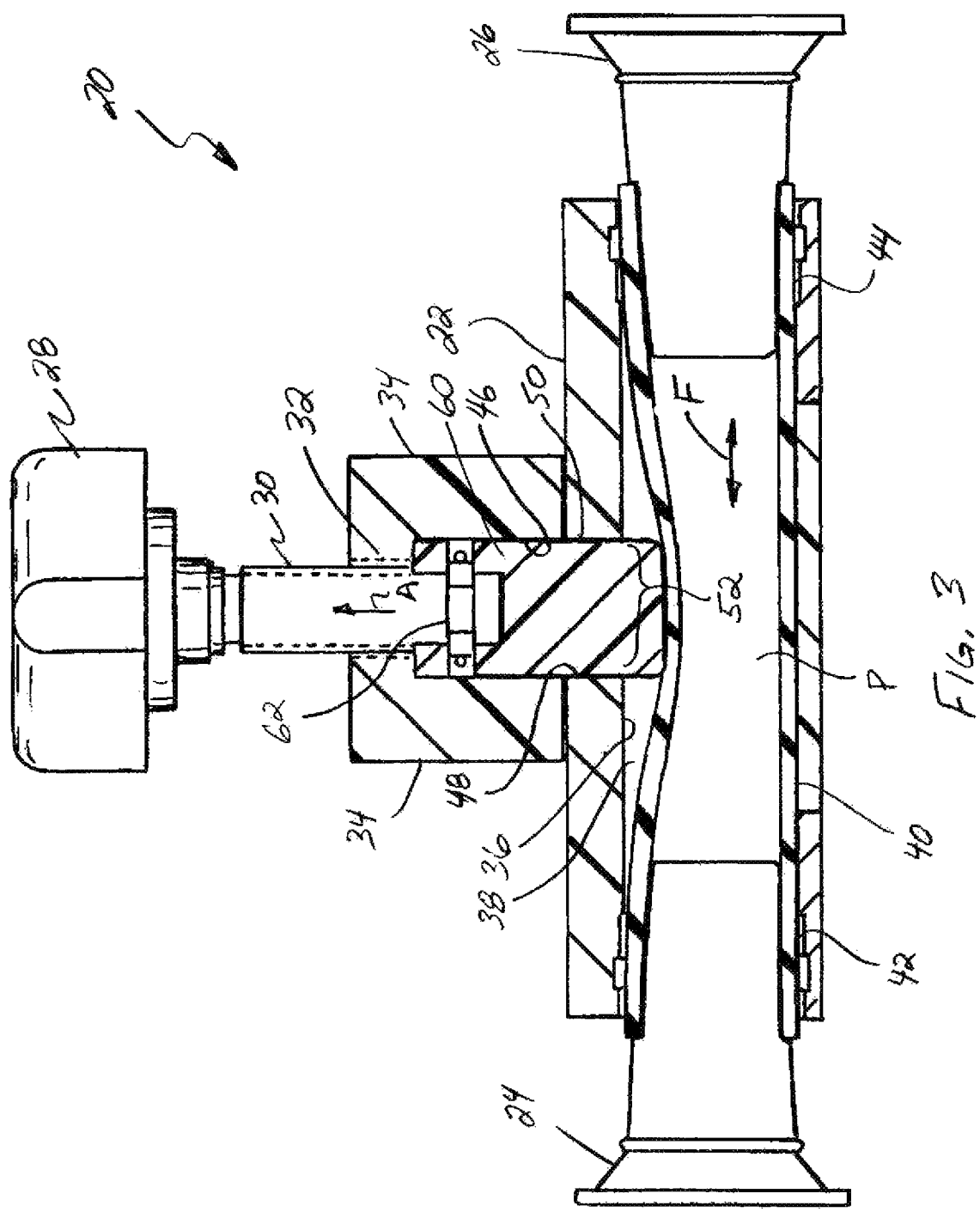
FIG. 3 is a sectional side view through the pinch valve, and showing a pinch valve member of the valve in about a full open position in association with a resilient tubular element of the valve shown essentially in a free state.

Referring now to the drawings, in FIGS. 1-9 a pinch valve 20 constructed and operable according to the teachings of the present invention is shown. Valve 20 includes a valve body 22 that is hollow and open on opposite ends to accommodate fittings 24 and 26 for attachment in fluid connection to a fluid system, such as tubes or hoses, in the well known manner, for flow of the fluid through valve body 22, also in the well known manner. A handle 28 external to valve body 22, connects to a threaded shaft 30 that extends into a threaded aperture 32 in a valve block 34 affixed to and forming a part of valve body 22. All of the above described elements can be fabricated from suitable rigid material such as a metal or plastics, in the well known manner.

Valve body 22 is a hollow, open ended structure including an inner surface 36 bounding and defining an open ended main passage 38 extending therethrough. A resiliently flexible, hollow tubular element 40 occupies passage 38, and has opposite ends 42 and 44 that connect to fittings 24 and 26, respectively. This connection can be made in any desired manner, such as, but not limited to, a friction and/or compression fit, barbs or other detents, mechanical fasteners, clamps, adhesives, and the like.

Tubular element 40 can be of conventional composition and construction, e.g., poly vinyl chloride, natural rubber, synthetic rubber, silicone, neoprene, perfluoroalkoxy, polytetrafluoroethylene, and various flexible plastics, etc., that can be repeatedly pinched closed and rebound to an open shape, either automatically or when pressurized fluid is present therein, and can comprise consumer or utility grade, food grade, and/or pharmaceutical grade tubing, as desired or required for a particular application. Tubular element 40 can also be provided in any desired cross sectional shape, such as a round, oval, or polygonal shape, in any diameter, as desired or required. Here, it can be observed that tubular element 40 has a free state generally round shape, as a non-limiting example, and inner surface 36 has essentially the same shape and is about the same diameter. Fluid can flow through a flow passage P tubular element 40 in either direction, generally denoted by the term "flow direction" identified by double ended arrow F in FIG. 3.

Valve block 34 is hollow and has an internal surface 46 that in combination with an inner surface portion 48 of valve body 22, bound and define a lateral passage 50 that connects at one end with threaded aperture 32, and at the opposite end with main passage 38 through a lateral opening 52 bounded and defined by inner surface 36 of valve body 22. Lateral passage 50 extends in a first lateral direction denoted by arrow A away from main passage 38. Lateral passage 50 and lateral opening 52 each have a generally rectangular shape when viewed in the first direction, lateral passage 50 being larger than lateral opening 52 in a second lateral direction denoted by arrow B (FIG. 5), extending sidewardly or laterally relative to the flow direction and the first direction, such that lateral passage 50 terminates at side surfaces 56 and 58 facing at least generally in the first direction (away from main passage 38) adjacent to and bounding opposite sides of lateral opening 52.

Figure 5:
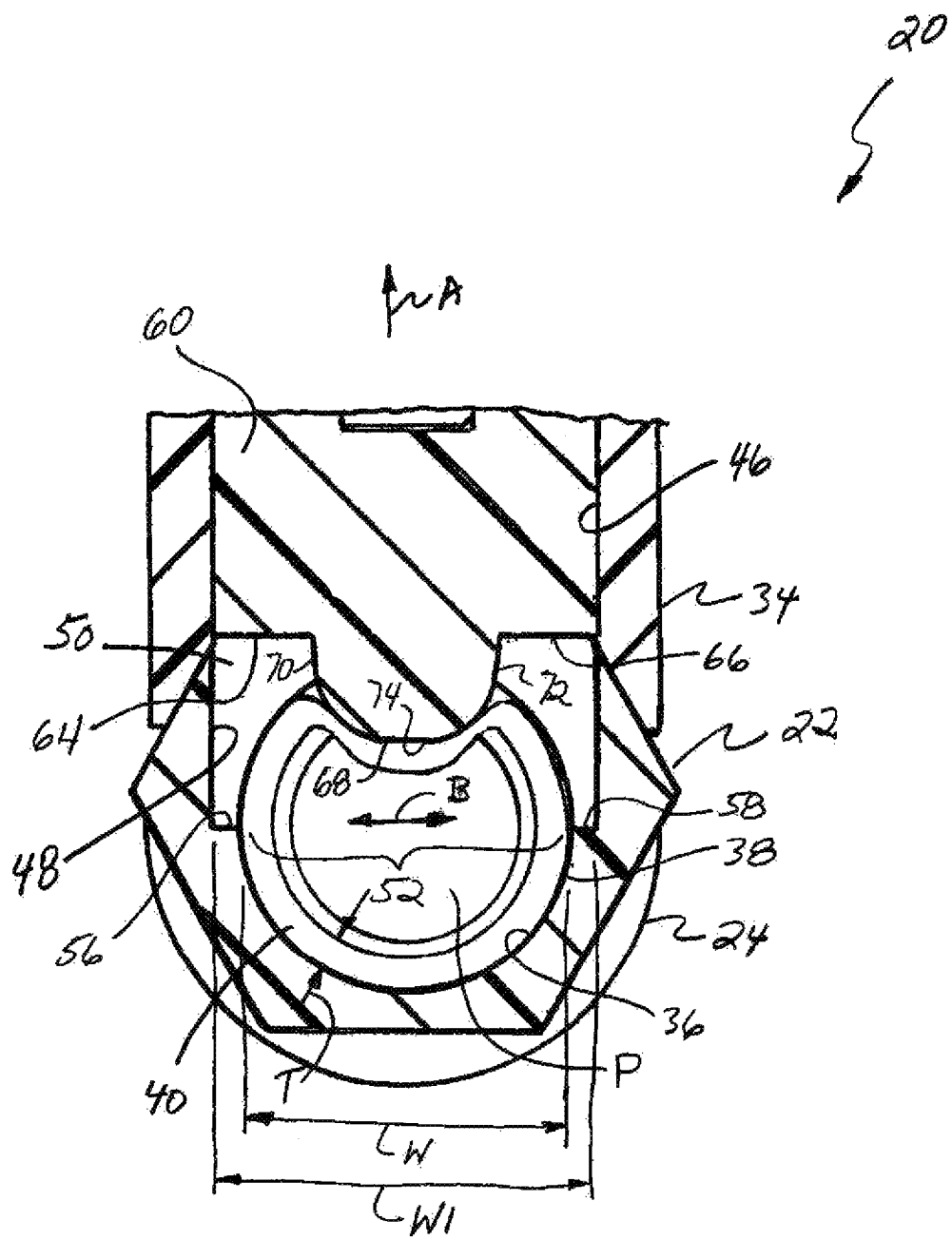
FIG. 5 is an enlarged sectional end view through the pinch valve with the pinch valve member in the full open position.

As also shown in FIG. 5, lateral opening 52 has a width W and lateral passage 50 has a width W1, which is a predetermined amount greater than width W. It can additionally be observed that lateral opening 52 has about the same dimension as the diameter or sideward extent in direction B of main passage 38 and also tubular element 40, and that the sides of lateral opening 52 extend to about the midpoint of main passage 38, and side surfaces 56 and 58 abut and extend sidewardly in opposite directions from the opposite sides of passage 38.

Figure 6:
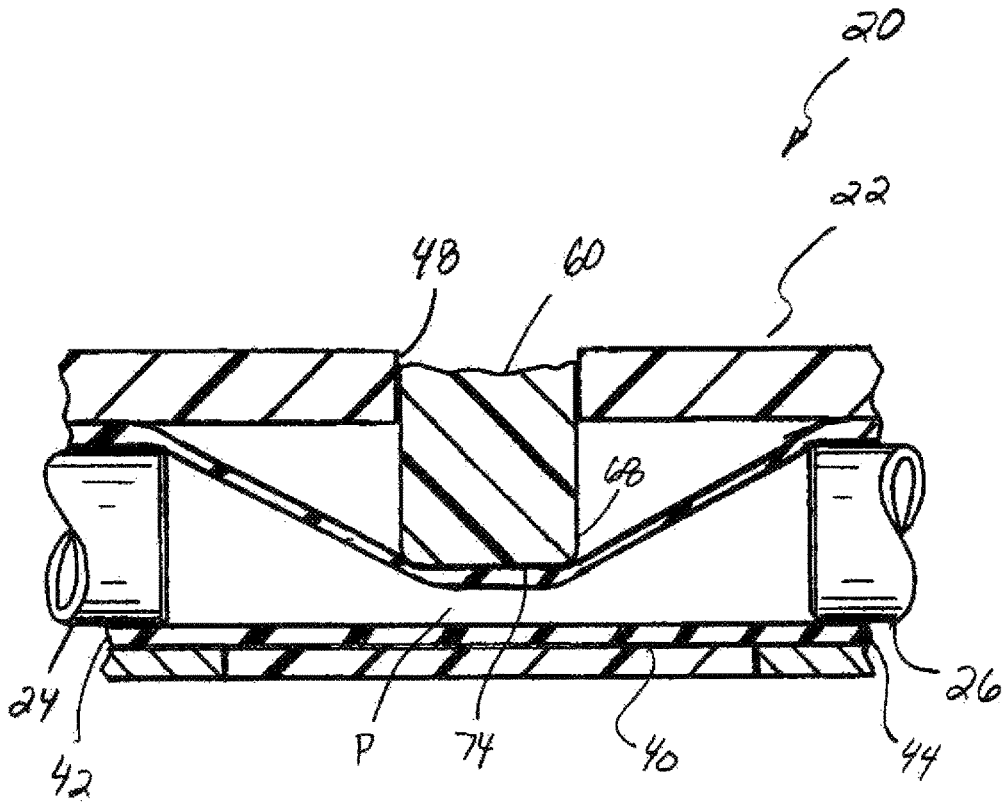
FIG. 6 is a sectional side view through the pinch valve with the valve member in a partially closed position pinching the tubular element to restrict flow therethrough.
Figure 7:
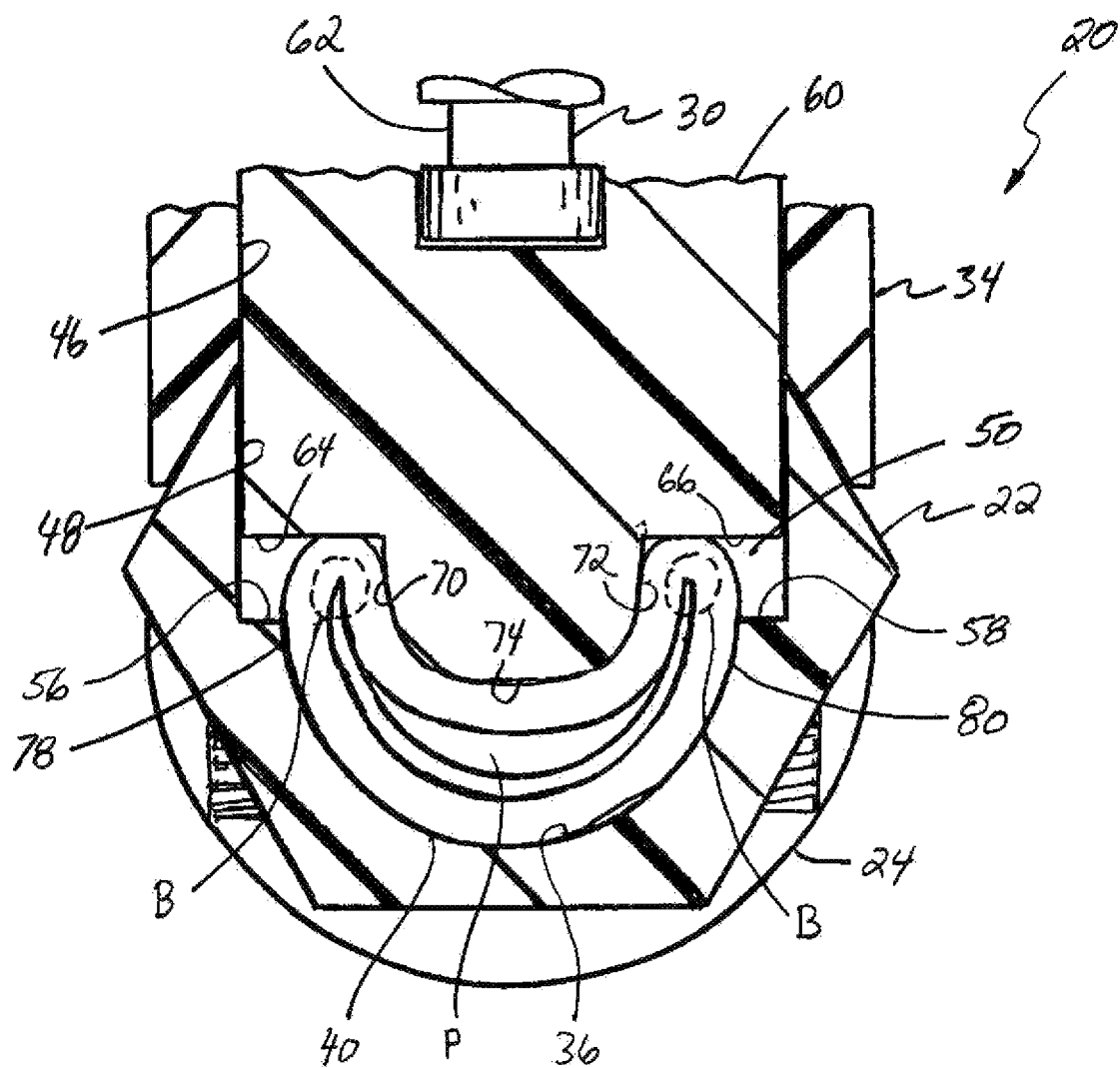
FIG. 7 is a sectional end view through the pinch valve with the valve member in the partially closed position pinching the tubular element into a generally crescent shape, and showing cooperation of the pinch head, pinch shoulders, and side surfaces pinching folded over ends of the crescent shape tubular element.

A pinch valve member 60 is disposed in lateral passage 50 for movement in a closing direction opposite the first direction A, and an opposite opening direction in direction A. Valve member 60 is movable between a full open position (FIGS. 3-4), and a full closed position (FIGS. 8 and 9), through a range of partially open positions (FIGS. 6 and 7). Here, to accomplish this capability, valve member 60 is supported or carried on an end of threaded shaft 30 via a rotary joint 62 that allows shaft 30 to be rotated by handle 28 relative to valve member 60 in threaded engagement with threaded aperture 32, to move the valve member in the desired closing or opening direction. As a non-limiting example, rotary joint 62 can comprise a hole in the end of member 60 that receives the end of shaft 30, and a cross slot in member 60 that intersects the hole, and a groove about shaft 30 that receives a C-clip or other retainer about the shaft, through the cross slot, to retain the shaft in the hole. As another example, a set screw can extend into the groove about shaft 30 to retain it.

Figure 4:
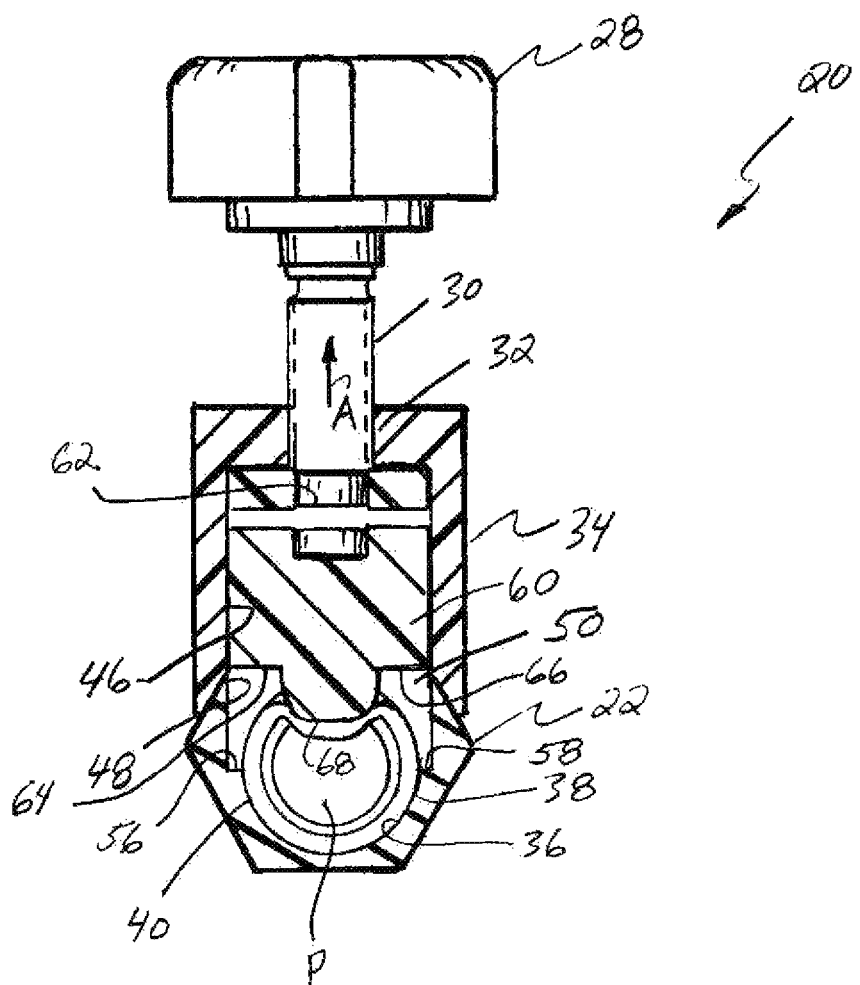
FIG. 4 is a sectional end view through the pinch valve taken along line 4-4 of FIG. 2, showing the pinch valve member in the full open position, and showing a pinch head and pinch shoulders of the pinch valve member in relation to the tubular element and side surfaces of a body of the valve.

Associated with valve member 60 for movement therewith are pinch shoulders 64 and 66, disposed in side regions or portions of lateral passage 50 in opposing relation to side surfaces 56 and 58, respectively; and a centrally located pinch head 68 that projects or extends from valve member 60 through lateral opening 52 into passage 38 so as to abut tubular element 40 when in the full open position, as illustrated in FIGS. 4 and 5. Here, in the full open position an endmost tip 74 of pinch head 68 is shown slightly deforming tubular element 40 from its generally round free state cross sectional shape, but it should be understood that this is not necessary and tip 74 can instead more gently abut the tubular element or not contact it at all in the full open position, as desired. Additionally in the full open position, it should be observed that pinch shoulders 64 and 66 are spaced a significant distance from tubular element 40. Examining FIGS. 5 through 9 it can be seen that in the transition from full open to full closed, tubular element 40 is deformed from its generally round or circular free state shape, through a range of progressively tighter or smaller crescent shapes in the range of partially open positions reducing the sectional extent of flow passage P, to a U-shape when in the full closed position, fully closing passage P. Structurally, shoulders 64, 66 and pinch head 68 can be of unitary construction integrated onto pinch valve member 60, or they can comprise one or more separate elements affixed to, carried on, or otherwise configured to be movable with the valve member, as desired or required for a particular application.

Figure 9:
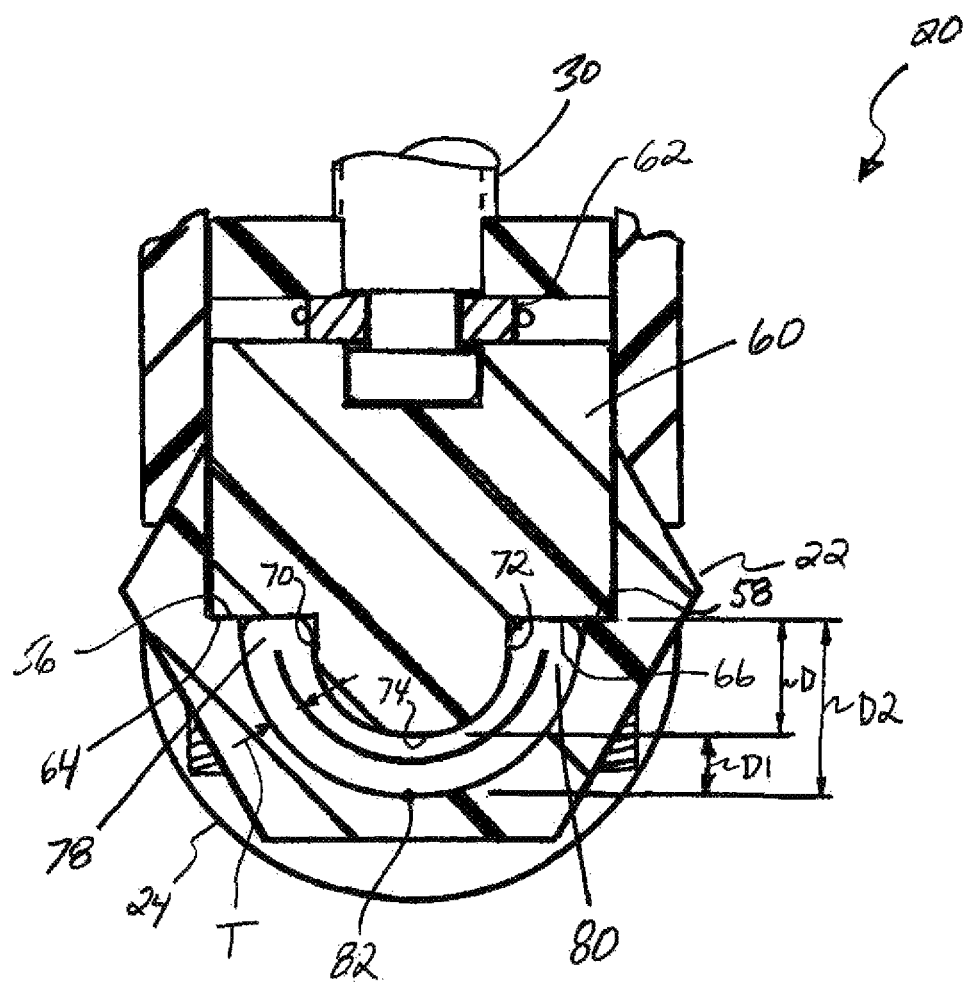
FIG. 9 is a sectional end view through the pinch valve with the valve member in the full closed position.

As shown in FIG. 9, pinch head 68 preferably has a rounded profile shape when viewed in the flow direction that is about the same as the profile shape of the opposing portion of inner surface 36 bounding and defining main passage 38 opposite lateral opening 52, e.g., a semicircular or rounded shape, but the pinch head will be a predetermined amount smaller in sectional or diametrical extent than the passage so that a substantially uniform gap or space exists between sides 70 and 72 of pinch head 68 and opposing portions of inner surface 36 when pinch head 68 is in main passage 38, and when the valve is fully closed the same gap or space will exist between tip 74 and the opposing portion of the inner surface, as will be explained, so that the tubular element is substantially uniformly pinched or compressed. In this embodiment, pinch shoulders 64, 66 are angularly related to sides 70 and 72 at about a 90 degree angle, respectively, and are positioned a predetermined spaced distance D from tip 74.

More particularly, valve 20 is configured such that, when in the full closed position, tip 74 will be positioned a predetermined distance D1 from a predetermined point 82 on an opposing portion of inner surface 36 farthest from lateral opening 52. As a result, because of the predetermined distance D to pinch shoulders 64 and 66, the shoulders will be located a predetermined distance D2 from point 82. Side surfaces 56 and 58 are also about this distance from that point. In this embodiment of valve 20, this distance relationship will place pinch shoulders 64 and 66 at least generally in abutment with side surfaces 56 and 58, as shown, to act to pinch ends 78 and 88 as the full closed position is reached.

Also in this embodiment, tubular element 40 is selected to have a sidewall thickness T (FIG. 5) of a predetermined value, and distance D1 will be equal to about twice the thickness T (FIG. 9). The gap between the opposing portions of inner surface 36 and sides 70 and 72 of pinch head 68 will also be equal to about twice the thickness T, for reasons explained next.

Examining FIGS. 5-9, it can be observed that pinch head 68 is configured, e.g., shaped, such that when valve member 60 is moved from the full open position, pinch head 68 will be driven against tubular element 40 to deform or pinch it into the progressively narrower crescent shapes as a function of the amount of movement, thereby reducing flow passage P. As best shown in FIG. 7, as this occurs, side or lateral end portions 78 and 80 are bent or folded over in overlaying relation, respectively, by movement of sides 70 and 72 of the pinch head into main passage 38. As this occurs, the endmost portions of lateral end portions 78 and 80 will initially tend to have a radiused bend in the region identified by circles, and see FIG. 16, thus at least temporarily forming a cavity that if allowed to remain, could trap fluid and/or provide a leak path. If an incompressible fluid is trapped, tubular element 40 can be deformed, or even perforated so as to be damaged and possibly leak, and thus this is to be avoided.

To avoid fluid entrapment, and reduce stress on the endmost portion of tubular element 40, the sides of lateral passage 50 provide a relief or expansion area into which tubular element 40 can initially expand to accommodate the radiusing of the very end, and then, as valve member 60 and pinch head 68 continue movement in the closing direction, the overlaying portions of ends 78 and 80 are pinched together laterally to complete closure. As this occurs, the overall extent of tubular element 40 in the first direction is thus reduced or compacted, so as to be withdrawn from close proximity to the open side regions of passage 50 (above side surfaces 56 and 58). Also as this occurs, it can be observed that ends 78 and 80 are brought substantially completely between the sides of inner surface 36 and sides 70 and 72, which are the distance D apart. As a result, all cavities within ends 78 and 80 are eliminated and any remaining fluid is removed in a manner somewhat analogous to a squeegeeing action, e.g., in the flow direction. Also as this occurs, tubular element 40 will be stretched in the region thereof generally between pinch head 68 and fittings 24 and 26, respectively, as illustrated in FIG. 6, which facilitates the folding over, and thus it is realized that the deformation into the U-shape is done in a three dimensional manner, which facilitates the smooth folding over and forming of the tubular element into the U-shape.

Figure 8:
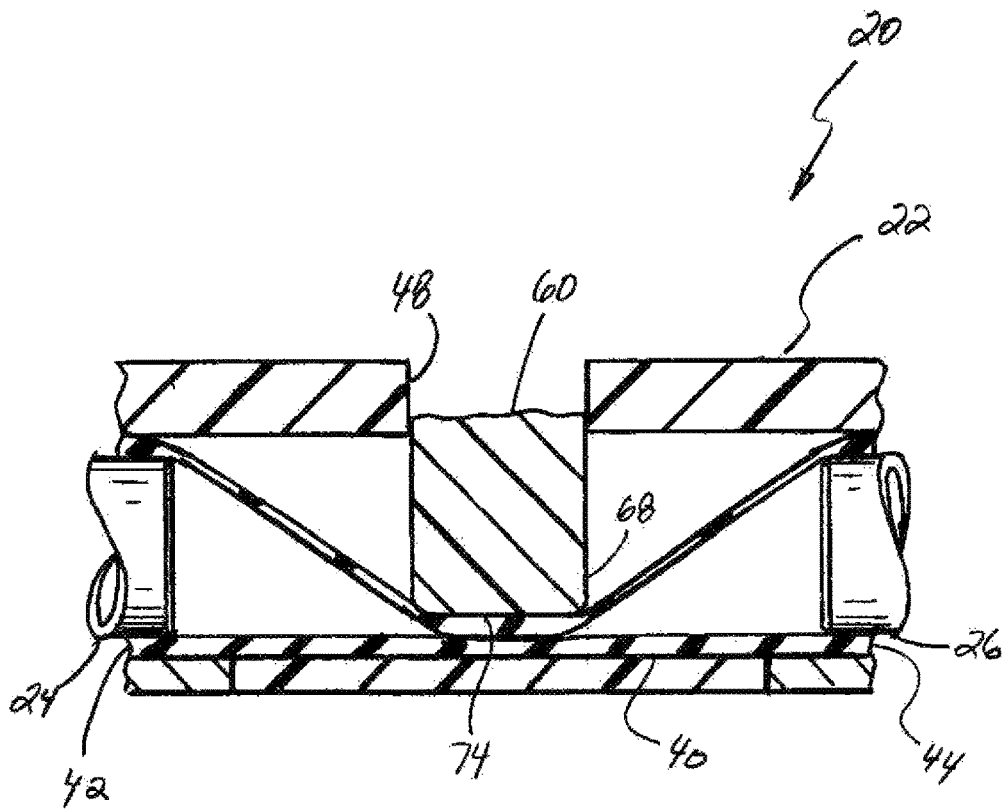
FIG. 8 is a sectional side view through the pinch valve, with the valve member in a full closed position pinching the tubular element into a generally U-shape and the pinch shoulders pinching the ends closed, to completely prevent flow through the tubular element.

Tubular element 40 now deformed into the U-shape, is pinched completely together in overlaying relation as valve member 60 approaches and reaches the full closed position, as shown in FIG. 9. At this point in the movement, ends 78 and 80 are substantially contained between the side portions of inner surface 36 of the valve body, and sides 70 and 72 of the pinch head, and now shoulders 64 and 66 are positioned to finally pinch and enclose the ends, leaving no space for cavities or voids that can trap fluid. In this condition, tubular element 40 will be stretched further between pinch head 68 and fittings 24 and 26, respectively, as illustrated in FIG. 8. Again, this is advantageous, as it helps to eliminate any voids or cavities and facilitates the folding of the ends, the pinch head essentially serving as a mandrel about which the tubular element is deformed.

Figure 10:
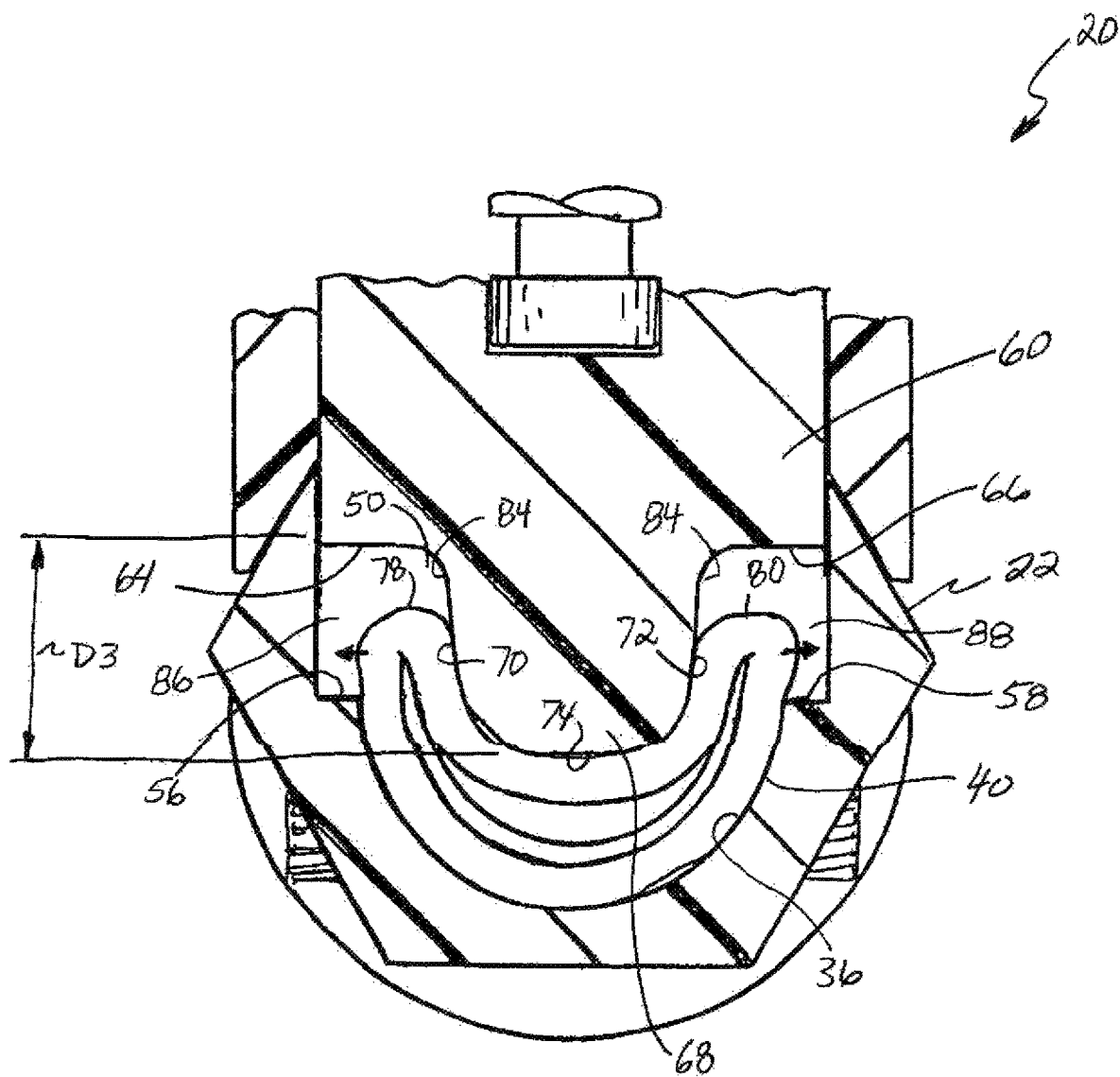
FIG. 10 is a sectional end view of the pinch valve including a second embodiment of a valve member including a pinch head and pinch shoulders of a different configuration, shown in a partially closed position pinching the tubular element to restrict flow therethrough.
Figure 11:
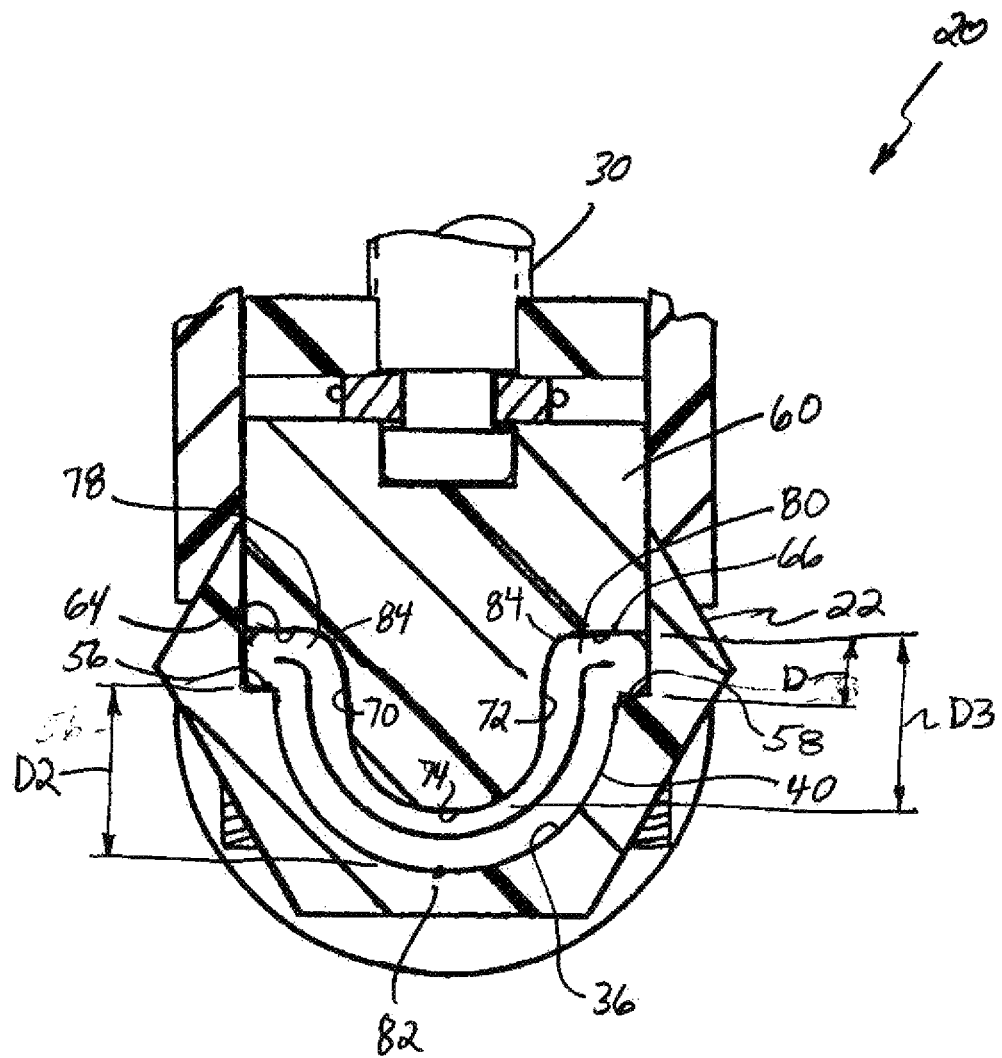
FIG. 11 is a sectional end view of the pinch valve of FIG. 10 with the valve member shown in a full closed position pinching the tubular element closed in a generally U-shape with folded over ends or legs of the U-shape pinched against the side surfaces of the body.

Referring also to FIGS. 10-13, variant embodiments of pinch valve 20 are shown. In FIGS. 10 and 11, body 22 of pinch valve 20 is the same, side surfaces 56 and 58 being located at distance D2 from point 82 on surface 36, and tip 74 of the pinch head being located the distance D1 from that point when valve member 54 is in the full closed position as shown in FIG. 11. However, pinch shoulders 64 and 66 are now a distance D3 from the end of tip 74, which is an increase over distance D of an amount about equal to distance D1 or twice the thickness of the sidewall of tubular element 40. This is significant as it places pinch shoulders 64 and 66 distance D from side surfaces 56 and 58 when the valve member is in the full closed position as shown in FIG. 11, such that lateral end portions 78 and 80 of the pinched tubular element can now be pinched closed between pinch shoulders 64 and 66 and side surfaces 56 and 58 as shown.

As explained above, as valve member 54 is moved through the partially closed positions, e.g., FIG. 10, lateral end portions 78 and 80 of tubular element 40 are pinched between side surfaces 70 and 72 and the opposing portions of inner surface 36, the endmost portions being allowed to deform or extrude into adjacent side regions 86 and 88 of lateral passage 50. This is shown here by arrows in FIG. 10. Here, it can be observed that the junctures of shoulders 64 and 66 and sides 70 and 72 of pinch head 68 essentially form concavities 84 that receive and facilitate bending and directing the ends 78 and 80 laterally or sidewardly in the directions of the arrows, so as to overlay side surfaces 56 and 58 so as to be positioned to be directly pinched by pinch shoulders 64 and 66. The junctures can be curved to facilitate the bending, if desired, and the side surfaces 56 and 58 with the adjacent sides of inner surface 36 are essentially convex in overall shape, so that, they act in cooperation with sides 70 and 72 and pinch shoulders 64 and 66 to bend ends 78 and 80 in the required manner as shown. As before, the tubular element 40 will be stretched longitudinally as valve member 60 is closed, as explained above in reference to FIGS. 6 and 8.

Figure 12:
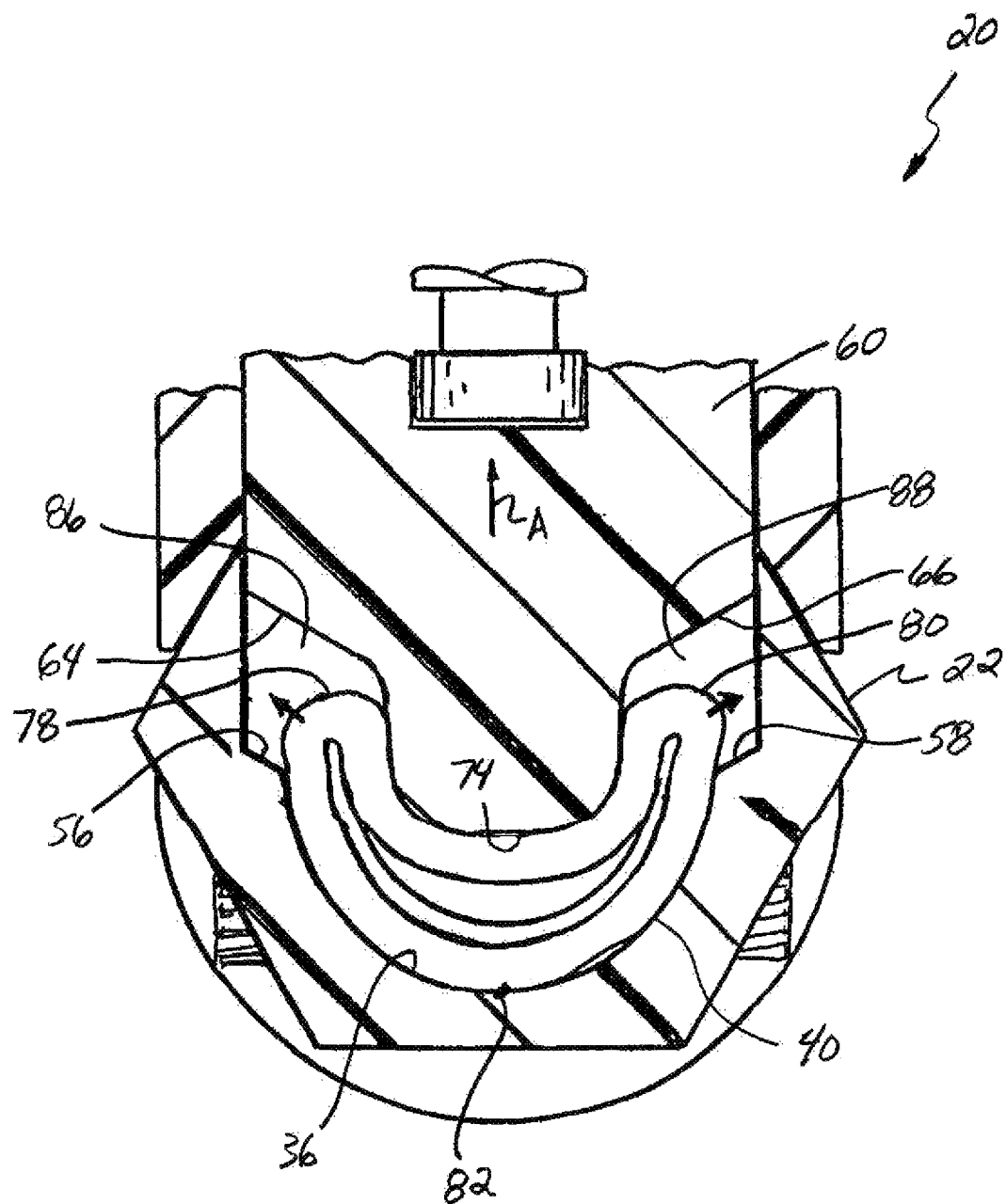
FIG. 12 is a sectional end view of the pinch valve including a third embodiment of a valve member including a pinch head with pinch shoulders oriented at an acute angle to a direction of movement of the valve member, shown in a partially closed position pinching the tubular element into a generally crescent shape to restrict flow therethrough.
Figure 13:
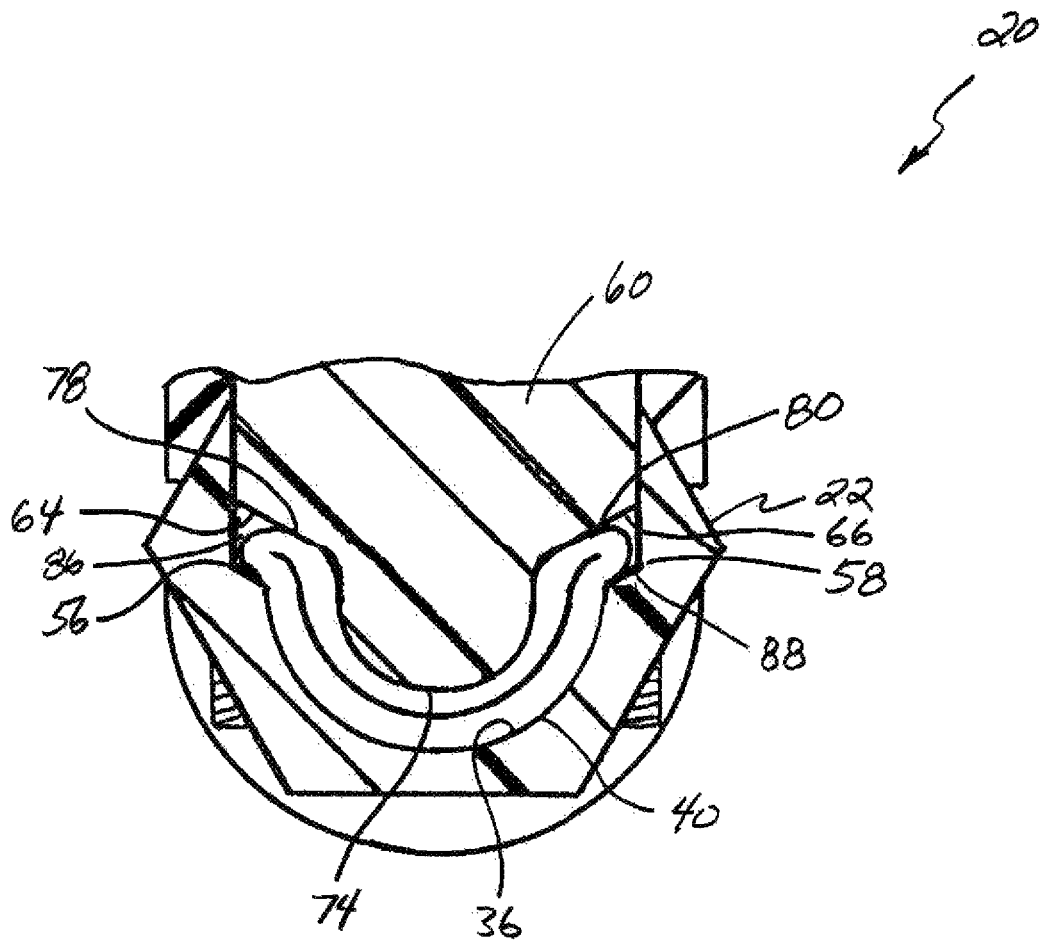
FIG. 13 is a sectional end view of the pinch valve of FIG. 12 with the valve member shown in a full closed position pinching the tubular element closed in a U-shape, the folded over ends or legs of the U-shape pinched closed against the side surfaces of the valve body by the pinch shoulders.

In FIGS. 12 and 13, body 22 of pinch valve 20 is changed slightly, inner edges of side surfaces 56 and 58 being located at about the same distance from point 82 on surface 36, and tip 74 of the pinch head being located the same distance from that point when valve member 54 is in the full closed position as shown in FIG. 13. However, side surfaces 56 and 58 and pinch shoulders 64 and 66 are oriented at an acute angle relative to direction A, so that lateral end portions 78 and 80 of tubular element 40 will be deformed or extruded into side regions 86 and 88, as shown by the arrows, respectively, and then pinched together at the acute angle. Also again, pinch head 74 and pinch shoulders 64 are located a predetermined distance apart so as to be positioned twice the thickness of the sidewall of tubular element 40 apart (distance D) when valve member 40 is in the full closed position. When the ends of the tubular element are pinched together in regions 86 and 88 there is no available space for cavities or voids between the pinched together portions of the tubular element, nor a space for the endmost portions to expand into so as to provide a leak path.

Figure 16:
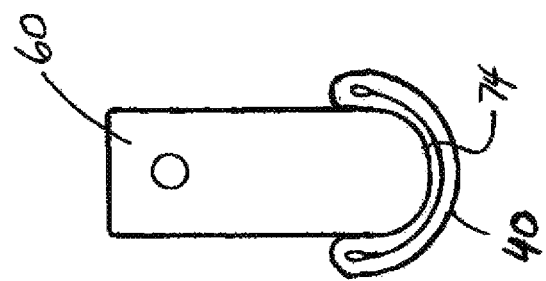
FIG. 16 is a simplified schematic representation of a valve member having a pinch head without pinch shoulders, pinching a tubular element into a generally U-shape.
Figure 15:
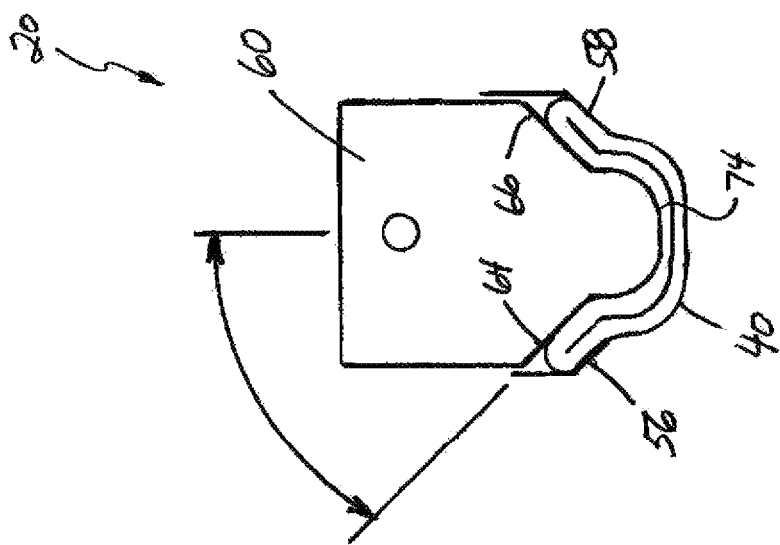
FIG. 15 is a simplified schematic representation of a valve member having associated pinch shoulders angularly related to the direction of movement of the valve member, shown pinching a tubular element into a generally U-shape with ends of the U-shape pinched closed by the shoulders at the angular relation.
Figure 14:
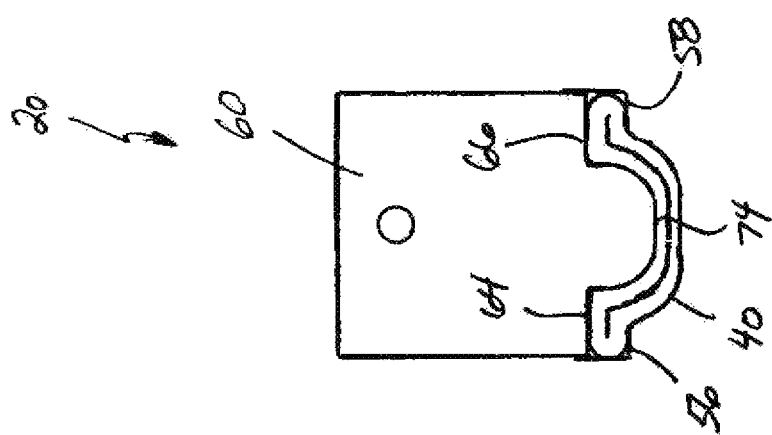
FIG. 14 is a simplified schematic representation of a valve member having associated pinch shoulders facing in the direction of movement of the valve member, shown pinching a tubular element into a generally U-shape with ends of the U-shape pinched closed by the shoulders.

FIGS. 14 and 15 are simplified illustrations showing the general concept of operation of the above described valves 20 including valve members 60 with pinch heads 74 including pinch shoulders 64 and 66 that function in cooperation with associated side surfaces 56 and 58 to deform or extrude the ends of the pinched tubular element 40, for comparison with FIG. 16 which shows a valve member 60 having a straight pinch head 74 without pinch shoulders and the possible outcome of looping of the ends of the pinched together tubular element 40 about the pinch head, to illustrate a problem to be avoided and an important advantage of the invention.

It should be understood that the invention is intended to be used and have utility in a wide variety of applications, and can be incorporated in manually operated valves and automatically operated valves such as those operated by electrical actuators, compressed air, and vacuum. The invention can also be incorporated into valves of a variety of sizes. Still further, the pinch head can have a variety of lengths and shapes when viewed from the side, for instance, as a non-limiting example, a length of about 1.5 times larger (or greater) than its width. The ends of the pinch head can have a variety of alternative shapes, including a tapered, curved, or boat or canoe hull shape, as desired.

Additionally, it should be understood that it is within the scope of the invention that pinch valves 20 can be configured in a variety of manners for different applications and regulating fluids. As a non-limiting example, the valve can be configured as a beer dispensing faucet, or a spirits or other beverage dispensing faucet, and for these application one end of the tubular element can be configured as or connect with a dispensing spout. To operate the faucet, instead of utilizing a threaded shaft and rotary joint for moving the valve member, a lever apparatus can be used. The beer will typically be pressurized, for instance, at a pressure as high as 40 psi, which pressure can spike higher, and to ensure that the faucet is not forced open from a closed condition by the pressure alone, the lever apparatus can be configured to have a mechanical advantage over the pressurized tubular element. As another non-limiting example, the lever can be weighted in a manner similar to known faucet handles. As another non-limiting example, the lever can be configured as a linkage, such as an over-center linkage or toggle linkage mechanism, operable to lock the valve member in the fully closed position and to release the valve member and retract it to a desired extent from the main passage by a simple movement of an associated lever or handle. Thus it should be understood that the pinch valve of the invention can be utilized with a variety of apparatus for supporting and moving valve member 60 between its open and closed positions, as alternatives to the threaded shaft and rotary joint discussed above. As non-limiting examples, commercially available or custom manufactured toggle or over center linkage mechanisms in connection with a smooth barrel or plunger.

In light of all the foregoing, it should thus be apparent to those skilled in the art that there has been shown and described a novel pinch valve. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A pinch valve, comprising:
a valve member movable to compress or pinch a resilient tubular element extending through a passage of a housing of the valve to varying extents to regulate fluid flow therethrough, including a pinch head movable to compress or pinch the tubular element through a range of progressively more flow restrictive crescent shapes into a U-shape, and which while doing so bends or folds over lateral end portions of the tubular element in cooperation with opposing lateral surfaces of the housing bounding the passage, and that includes laterally located associated elements that further pinch the folded over lateral end portions closed when the pinch head is in a full closed position, the laterally located associated elements comprising pinch shoulders angularly related to the pinch head and that pinch the folded over lateral end portions at an angle to a direction of movement of the pinch head, and the pinch head being matingly shaped to but smaller than the passage when viewed in the direction of the flow, in the full closed position the pinch head extending a maximum extent into the passage while the pinch shoulders are disposed in a lateral passage of the housing in opposing relation to side surfaces of the housing bounding portions of the lateral passage adjacent to the opposing lateral surfaces of the housing, respectively, such that the pinch head is spaced a predetermined distance from a predetermined reference location on a portion of an inner surface of the housing bounding the passage between the opposing lateral surfaces of the housing, sides of the pinch head are spaced the predetermined distance from the opposing lateral surfaces of the housing, respectively, and the pinch shoulders are spaced the predetermined distance from the side surfaces, respectively, to completely close and prevent flow through the tubular element.

2. The pinch valve of claim 1, wherein the pinch shoulders are oriented at between a 20 degree and a 90 degree angle to the direction of movement of the pinch head.

3. The pinch valve of claim 1, wherein the pinch shoulders are convex shaped, positioned and oriented to pinch the folded over lateral end portions against matingly shaped concave lateral surfaces beside the pinch head.

4. A pinch valve, comprising:
a valve body including an inner surface extending about and defining a main passage extending in a flow direction through the valve body having a size and shape to cooperatively receive a resiliently compressible tubular element therein in occupying relation thereto;
the inner surface of the valve body bounding and defining a lateral opening connecting the main passage to a lateral passage extending therefrom in a first direction lateral to the flow direction, a portion of the inner surface bounding the main passage opposite the lateral opening having a predetermined sectional shape and size when viewed in the flow direction, and the valve body having side surfaces facing in the first direction bounding opposite sides of the lateral passage and located a predetermined first distance from a predetermined reference location on the portion of the inner surface bounding the main passage opposite the lateral opening;
a pinch valve member supported in the lateral passage for movement in a closing direction toward the main passage and opposite opening movement in the first direction, a pinch head disposed for movement with the pinch valve member so as to move between the side surfaces of the valve body into the main passage when the valve member is moved in the closing direction, the pinch head having pinch shoulders and sides adjacent to the pinch shoulders, respectively, the pinch head including the sides adjacent to the pinch shoulders being matingly shaped to but smaller than the inner surface of the main passage, the pinch head having a predetermined full closed position in the main passage at which the sides of the pinch head will be spaced a predetermined second distance from opposing portions of the inner surface bounding the main passage opposite the lateral opening, a predetermined endmost portion of the pinch head will be spaced the predetermined second distance from the predetermined reference location on the portion of the inner surface bounding the main passage opposite the lateral opening, and the pinch shoulders disposed for movement with the pinch head in opposing relation to the side surfaces, respectively, the pinch shoulders being spaced a predetermined third distance in the first direction from the predetermined endmost portion of the pinch head so as to be located at the predetermined second distance from the side surfaces, respectively, so as to extend longitudinally parallel to the side surfaces, respectively.

5. The pinch valve of claim 4, comprising the tubular element disposed in the main passage having a sidewall thickness equal to one half of the predetermined second distance.

6. The pinch valve of claim 5, wherein the valve member has a T-shape when viewed in the flow direction, and the tubular element has a round shape when viewed in the flow direction with the valve member in a full open position, and a U-shape with laterally outwardly extending folded over lateral end portions when the valve member is in or near the full closed position.

7. The pinch valve of claim 4, wherein the pinch head is part of the pinch valve member.

8. The pinch valve of claim 4, wherein the side surfaces and the pinch shoulders are oriented at an acute angle relative to the first direction.

9. The pinch valve of claim 8, wherein the side surfaces of the valve body, the pinch shoulders, and opposite sides of the pinch head define and bound spaces beside the pinch head, respectively, positioned to receive and pinch folded over lateral end portions of the tubular element closed when the pinch valve is moved to the full closed position.

10. The pinch valve of claim 4, wherein the sides of the pinch head are configured to cooperate with portions of the inner surface of the valve body beside the lateral opening to bend or fold lateral end portions of the tubular element when received in the main passage into overlaying relation as the valve member is moved in the closing direction.

11. A pinch valve, comprising:
a valve body including an inner surface extending about and defining a main passage extending in a flow direction through the valve body, the inner surface including a lateral opening connecting the main passage with a lateral passage extending in a first direction lateral to the flow direction, the valve body having side surfaces facing in the first direction bounding opposite side portions of the lateral passage, respectively;
a resiliently compressible tubular element extending through and occupying the main passage, including a sidewall bounding and defining a flow passage through the tubular element configured to carry a fluid in the flow direction;
a pinch valve member disposed in the lateral passage, including a pinch head facing the main passage and pinch shoulders adjacent opposite sides of the pinch head, respectively, the pinch head and the sides thereof adjacent to the pinch shoulders being matingly shaped to but smaller than the inner surface of the main passage when viewed in the flow direction with the pinch shoulders opposing and extending parallel to the side surfaces in the flow direction, respectively, the pinch valve member having a full open position wherein the pinch head is at least largely withdrawn from the main passage, a full closed position wherein the pinch head extends a maximum extent into the main passage such that an endmost portion of the pinch head is spaced a predetermined distance from a predetermined reference location on a portion of the inner surface opposite the lateral opening, the sides of the pinch head are spaced the predetermined distance from opposing portions of the inner surface adjacent to the side surfaces, respectively, and the pinch shoulders are spaced the predetermined distance from the side surfaces, respectively, when the pinch valve member is in the full closed position the pinch head bearing against and holding a center portion of the tubular element in conforming relation against the portion of the inner surface opposite the lateral opening to close a portion of the flow passage, and the pinch shoulders bearing against and pinching opposite lateral end portions of the tubular element in conforming relation against the side surfaces, respectively, to close remaining portions of the flow passage.

12. The pinch valve of claim 11, wherein when the valve member is in the full open position the tubular element has a round sectional shape when viewed in the flow direction, and when the pinch valve member is in the full closed position the center portion of the tubular element has a U-shape and the lateral end portions thereof extend laterally outwardly therefrom.

13. The pinch valve of claim 11, wherein when the pinch valve member is moved from the full open position to the full closed position, the sides of the pinch head are spaced the predetermined distance from the opposing portions of the inner surface adjacent to the side surfaces, respectively, so as to fold portions of the sidewall into sliding overlaying relation between the sides of the pinch head and the portions of the inner surface, respectively.

14. The pinch valve of claim 11, wherein the side surfaces are oriented to face directly in the first direction, and the pinch shoulders are oriented to extend oppositely relative to the side surfaces, in parallel relation thereto in the flow direction.

15. The pinch valve of claim 11, wherein the side surfaces and the pinch shoulders are oriented to face at an acute angle relative to the first direction.

16. The pinch valve of claim 11, wherein the pinch shoulders and adjacent sides of the pinch head have an overall concave shape when viewed in the flow direction, and the side surfaces and adjacent portions of the inner surface have a convex shape when viewed in the flow direction that mates with the concave shape, such that the pinch shoulders and the sides of the pinch head cooperate to pinch the lateral end portions of the tubular element about the side surfaces and the adjacent portions of the inner surface when the pinch valve member is in the full closed position.

17. A pinch valve, comprising:

a valve body including an inner surface extending about and defining a main passage extending in a flow direction through the valve body and configured to receive a resiliently flexible tubular element to carry a fluid through the valve, a portion of the inner surface bounding a lateral opening connecting to a lateral passage extending in a first direction laterally relative to the flow direction, the lateral passage having a sideward extent greater than a sideward extent of the main passage parallel thereto and terminating at side surfaces extending in the flow direction and facing in the first direction and located adjacent to opposite sides of the main passage and bounding opposite sides of the lateral opening, respectively; and a pinch valve member disposed in the lateral opening and having a pinch head disposed for movement through the lateral opening relative to the main passage, the pinch valve member having pinch shoulders spaced in the first direction from an endmost portion of the pinch head and extending sidewardly so as to be aligned with the side surfaces, respectively, the pinch head and sides thereof adjacent to the pinch shoulders being matingly shaped to but smaller than the inner surface opposite the lateral opening when viewed in the flow direction, the pinch valve member having:

i. a full open position with the pinch head retracted from the main passage into the lateral passage such that the tubular element will be in a free state shape to allow full flow therethrough;

ii. a range of partially open positions wherein the pinch valve member will deform the tubular element by folding opposite lateral end portions thereof into overlaying relation to form the tubular element into a crescent shape when viewed in the flow direction; and iii. a full closed position wherein the pinch head extends a maximum extent into the main passage while the pinch shoulders are disposed in the lateral passage in opposing relation to the side surfaces, respectively, such that the endmost portion of the pinch head is spaced a predetermined distance from a predetermined reference location on a portion of the inner surface opposite the lateral opening, the sides of the pinch head are spaced the predetermined distance from opposite sides of the main passage, respectively, and the pinch shoulders are spaced the predetermined distance from the side surfaces, respectively, and such that the folded opposite lateral end portions of the tubular element are pinched closed against the side surfaces by the pinch shoulders longitudinally in the flow direction, respectively, to completely close and prevent flow through the tubular element.

18. The pinch valve of claim 17, wherein the sides of the pinch head are spaced from the opposite sides of the main passage adjacent to the opposite side surfaces, respectively, by an amount to fold portions of the tubular element into sliding overlaying relation between the sides of the pinch head and the opposite sides of the main passage, respectively, as the pinch valve member is moved through the range of partial open positions.

19. The pinch valve of claim 17, wherein the side surfaces are oriented to face directly in the first direction, and the pinch shoulders are oriented to face the side surfaces, in parallel relation thereto.

20. The pinch valve of claim 17, wherein the side surfaces and the pinch shoulders are oriented to face at an acute angle relative to the first direction.

21. The pinch valve of claim 17, wherein the pinch shoulders and sides of the pinch head are configured to cooperate to bend and pinch together the folded portions of the tubular element as the pinch valve member is moved to the full closed position.

* * * * *